(12) United States Patent
Lauschke et al.

(10) Patent No.: US 11,745,772 B2
(45) Date of Patent: Sep. 5, 2023

(54) GANGWAY FOR CONNECTING A FIRST CAR OF A MULTI-CAR VEHICLE TO A SECOND CAR

(71) Applicant: DELLNER COUPLERS AB, Falun (SE)

(72) Inventors: Uwe Lauschke, Magdeburg (DE); Jason Fowler, Derby (GB); Daniel Alton, Staffordshire (GB); Samuel Oldroyd, Leicestershire (GB)

(73) Assignee: Dellner Couplers AB, Falun (SE)

( * ) Notice: Subject to any disclaimer, the term of this patent is extended or adjusted under 35 U.S.C. 154(b) by 434 days.

(21) Appl. No.: 16/945,137

(22) Filed: Jul. 31, 2020

(65) Prior Publication Data

US 2021/0070326 A1    Mar. 11, 2021

(30) Foreign Application Priority Data

Aug. 2, 2019 (EP) .................................... 19189891
Dec. 13, 2019 (EP) .................................... 19216164

(51) Int. Cl.
*B61D 17/22* (2006.01)
*B60D 5/00* (2006.01)

(52) U.S. Cl.
CPC ............ *B61D 17/22* (2013.01); *B60D 5/006* (2013.01)

(58) Field of Classification Search
CPC ........ B61D 17/22; B61D 17/20; B60D 5/006; B60D 5/003
See application file for complete search history.

(56) References Cited

U.S. PATENT DOCUMENTS

| 443,075 | A | * | 12/1890 | Elliott | B61D 17/20 |
| | | | | | 105/10 |
| 1,514,373 | A | * | 11/1924 | Coutant | B61D 17/20 |
| | | | | | 267/52 |
| 2,090,493 | A | * | 8/1937 | Wells | E05B 63/24 |
| | | | | | 292/341.17 |

(Continued)

FOREIGN PATENT DOCUMENTS

| CA | 1043167 | | 11/1978 | | |
| DE | 3514760 | A * | 10/1986 | ............. | B60D 5/006 |

(Continued)

*Primary Examiner* — Mark T Le
(74) *Attorney, Agent, or Firm* — Howard IP Law Group, PC

(57) ABSTRACT

A gangway for connecting a first car of a multi-car vehicle to a second car, the gangway having a first element and a second element of a group of elements comprised of a first vehicle mounting plate at a first end for mounting the gangway to the first car, a second vehicle mounting plate at a second end for mounting the gangway to the second car, a center frame and a hoop between the first and second vehicle mounting plates, whereby the gangway has a normal position in which the first element has a predefined position relative to the second element, a spring element is connected to a first connection point on the first element and to a second connection point on the second element, whereby in the normal position of the gangway the first connection point is at a different height compared to second connection point, and/or is arranged either further outward or further inward than the second connection point.

21 Claims, 4 Drawing Sheets

(56) References Cited

U.S. PATENT DOCUMENTS

| | | | | |
|---|---|---|---|---|
| 4,252,065 A | * | 2/1981 | Bickel | B61D 17/20 |
| | | | | 105/10 |
| 4,765,249 A | * | 8/1988 | Ishizuka | B61D 17/22 |
| | | | | 105/10 |
| 2010/0212538 A1 | | 8/2010 | Huppert et al. | |

FOREIGN PATENT DOCUMENTS

| | | |
|---|---|---|
| DE | 92 02 851.9 U1 | 5/1992 |
| EP | 0 206 583 A2 | 12/1986 |
| FR | 2 287 354 A1 | 5/1976 |
| JP | S62-105766 A | 5/1987 |

* cited by examiner

GANGWAY FOR CONNECTING A FIRST CAR OF A MULTI-CAR VEHICLE TO A SECOND CAR

FIELD OF INVENTION

The invention relates to a gangway for connecting a first car of a multi-car vehicle to a second car. The invention also relates to a multi-car vehicle with a first car and a second car.

BACKGROUND

From WO 2016/041638 A1 a gangway for connecting a first car with a second car and allowing passage of passengers from the first car to the second car is known. The gangway has a first vehicle mounting plate (called "first hoop for attaching the gangway to the first car" in WO 2016/041638 A1). The gangway also has a second vehicle mounting plate (called "second hoop for attaching the gangway to the second car"). The gangway is further described to have a frame (called "third hoop") arranged between the first vehicle mounting plate and the second vehicle mounting plate. The gangway is also described to have a further frame (called "fourth hoop" in WO 2016/041638 A1) arranged between the first vehicle mounting plate and the second vehicle mounting plate. WO 2016/041638 A1 teaches a connection element to be arranged between the one frame (called "third hoop" in WO 2016/041638 A1) and the other frame (called "fourth hoop" in WO 2016/041638 A1) and for this connection element to elastically connect the one frame (the "third hoop") to the other frame (the "fourth hoop").

For gangways for connecting a first car with a second car of a multi-car vehicle, it is desirable that the gangways are designed to return to a normal position, if the first car and the second car come into a geometric relation to one another that is a representation of the normal position. Typically, the normal position is the position, when the first car and the second car are arranged in a straight line one behind the other and on a level plane.

Making use of a connection element between one frame and a further frame of a gangway that elastically connects the frames has influence on the way the gangway will return to the normal position, e.g. after the multi-car vehicle has returned from driving around a bend into the straight line position.

Given this background, the problem to be solved by the invention is to improve the behavior of a gangway in situations where the first car of the multi-car vehicle changes its relative position relative to the second car of the multi-car vehicle, e.g. in situations, where the multi-car vehicle after having travelled around a bend returns to a straight line position.

SUMMARY

This problem is solved by the gangway and the multi-car vehicle according to the present claims. Preferred embodiments are given in the subordinate claims and the description that follows hereafter.

The gangway according to the invention is suitable for connecting a first car of a multi-car vehicle to a second car of the multi-car vehicle.

Multi-car vehicles are known in different designs and in different forms of adaptation for uses. Multi-car vehicles, for example, railway-bound trains (street cars and subway-trains also being considered as such trains) are known and are known for the purpose of transporting passengers as well as transporting goods. Further types of multi-car vehicles can be magnetic railway trains or can be buses (road buses as well as buses travelling on fixed tracks). A car of a multi-car vehicle can be a self-supporting car, whereby the car has sufficient wheels that are placed at sufficient locations such that the car can stand by itself without being supported by other cars, for example a three-wheeled car, a four wheeled car or a car with even more wheels placed suitable locations. A car of a multi-car vehicle can also be of the non-self-supporting type, whereby the car has no wheels or only wheels provided in such number or arranged at such a place that the car cannot stand by itself, but is vertically supported by at least one neighbouring car.

The present invention pertains to a gangway that can in a preferred embodiment be used with such types of multi-car vehicles and is suitable to connect a first car with a second car and to allow passage of passengers from the first car to the second car. In the majority of embodiments, the cars of the multi-car vehicle will be connected by a separate connecting device, for example a coupler, that connects the cars in a manner allowing the transmittal of substantial pulling and pushing forces. In the majority of cases, the gangway is designed separately and predominantly designed with the requirements for the passage of passengers from the first car to the second car in mind.

Such gangways are known to be designed of different individual elements.

Some gangways are designed to have a first vehicle mounting plate at a first end for mounting the gangway to the first car and/or to have a second vehicle mounting plate at a second end for mounting the gangway to the second car.

A vehicle mounting plate is understood to be the interface of the gangway that is arranged at the end of the gangway to connect the gangway to the car. Designs are known, where the end of the gangway is directly connected to the car. It is even feasible that the last convolute of a bellows of a gangway is directly bolted to the first car. However, in such a design, the gangway would not have a vehicle mounting plate. More typical designs are, however, that the car has a specific end design, e.g. an end frame, and that the gangway has a vehicle mounting plate. The vehicle mounting plate is mounted against the end frame of the car. Such designs facilitate the division of labor. Such designs allow the car of the multi-car vehicle to be manufactured at one manufacturing site and the gangway to be manufactured at a different manufacturing site, the vehicle mounting plate allowing for easy attachment of the gangway to the car in an assembly plant. Additionally, the use of a vehicle mounting plate allows the multi-car vehicle to be at least partially disassembled. If one car of a multi-car vehicle is to be decoupled from the multi-car vehicle, e.g. if the multi-car vehicle is to be shortened, the use of a vehicle mounting plate facilitates the detachment of one car from the multi-car vehicle. The vehicle mounting plate allows for designs that can allow for easy attachment and easy detachment of the vehicle mounting plate (and thus the gangway) to a car.

A gangway according to the invention can have a first vehicle mounting plate at a first end for mounting the gangway to the first car and can have a second vehicle mounting plate a second end for mounting the gangway to the second car. Such designs are often used when the gangway takes up the complete room between the first car and the second car.

A gangway according to the invention can also have a first vehicle mounting plate at a first end for mounting the gangway to the first car, but no second vehicle mounting plate at a second end that could be used for mounting the gangway to the second car. In such a design, the gangway is either designed to be directly attached to the second car without a vehicle mounting plate, e.g. if the last convolute of the bellows of the gangway is directly attached to the car. More typically for those designs is, however, a design, where the gangway would have a first vehicle mounting plate and a frame, whereby the frame is arranged at the second end of the gangway. Such a design could be used to attach this gangway to a second gangway, whereby the second gangway could in a preferred embodiment have a (second) vehicle mounting plate at one end and would also have a frame at its other end, which frame could be used to attach the second gangway to the frame of the first gangway. Such designs are, e.g. used to allow a splitting of the gangways, whereby the respective gangway remains attached to its respective car.

The gangway according to the invention can have a frame. In a gangway that has a first vehicle mounting plate and a second vehicle mounting plate, such a frame can be arranged between the first vehicle mounting plate and the second vehicle mounting plate. In designs of gangways that only have a first vehicle mounting plate at a first end for mounting the gangway to the first car, the frame can be arranged at the second end of the gangway. In such a design, the frame could be attached to a frame at an end of a second gangway, said second gangway having a second vehicle mounting plate at a second end for mounting the second gangway to the second car. A frame arranged at an end of a gangway sometimes is also referred to as "face plate". Such a design could in a even more preferred embodiment have a further frame that is arranged between the first vehicle mounting plate at the first end and the frame at the second end.

The gangway can also have a hoop. In a gangway that has a first vehicle mounting plate and a second vehicle mounting plate, such a hoop can be arranged between the first vehicle mounting plate and the second vehicle mounting plate. In a gangway that has a first vehicle mounting plate at a first end for mounting the gangway to the first car and has a frame arranged at the second end of the gangway, the hoop can be arranged between the first vehicle mounting plate and the frame arranged at the second end of the gangway.

For the description of this invention, a "frame" is considered as an object that is suitable to be attached to a supporting piece or to rest on a supporting piece. A frame hence has sufficient strength to take up a portion of the weight of the gangway and to transfer this weight into the supporting piece. The supporting piece could, e.g., be an arm, whereby the frame is attached to the arm. The support piece could also be a beam, whereby the frame rests on the beam. The support piece could also be the coupler of a train, whereby the frame rests on the coupler of the train/is supported by the coupler of the train.

Such a (first or second) vehicle mounting plate or frame can be of u-shape or c-shape or can have the shape of a ring that surrounds a passage space. The passage space is the window in the frame, through which the passengers can enter into the gangway/pass through the gangway. The term "ring" is not limited to circular rings or elliptically shaped rings. The term "ring" simply identifies that the frame closes around the passage space. The ring can, for example, also have a rectangular shape. The ring can also have a trapezoidal shape or any polygionial shape. In some designs, the ring can have a top beam and a bottom beam that are straight and have two side beams that connect the respective ends of the top beam and the bottom beam, whereby the side beams can have a curvature. The shape of the (first or second) vehicle mounting plate or frame beam often is chosen either in dependency of the overall shape of the object, to which it is attached. Hence the (first or second) vehicle mounting plate or frame often is designed in dependency of the cross-sectional shape of a car of a multi-car train or a further gangway, to which it might be connected. The shape of the (first or second) vehicle mounting plate or frame can also be chosen in relation to the interface that the neighbouring object, to which the (first or second) vehicle mounting plate or frame is to be connected, offers.

The (first or second) vehicle mounting plate or frame comprises a beam. The (first or second) vehicle mounting plate or frame can be made up of several beams that are connected to each other. For example, if the (first or second) vehicle mounting plate or frame is chosen to be u-shaped, the (first or second) vehicle mounting plate or frame can have a straight top beam with a first end and a second end, whereby a side frame is connected to the first end and a further side frame is connected to the second end of the top beam, the two side beams extending at an angle, preferably at an angle of about or exactly 90° to the top beam. In an embodiment, wherein the (first or second) vehicle mounting plate or frame is designed to be a ring, the (first or second) vehicle mounting plate or frame can have a top beam, two side beams and a bottom beam. Additional beams can be provided, for example between one end of a top beam and one end of a side beam, for example by way of a diagonal beam that connects one end of a top beam with the top end of a side beam. A u- or c-shaped (first or second) vehicle mounting plate or frame or even a ring-shaped (first or second) vehicle mounting plate or frame can be made up of one singular beam. Using extrusion methods or moulding methods, it is possible to provide such end beams that are made of one singular beam that is moulded or extruded into the desired u-, c- or even ring-shape (whereby when producing a ring-shape it might become necessary to interconnect two free ends of an extruded profile for example by welding or gluing in order to complete the ring).

In a preferred embodiment, the beam is a longitudinal beam. In a preferred embodiment, the extent of the beam in a first direction of a three-dimensional system of coordinates, especially preferred a cartesian system of coordinates, is substantially larger than the extent of the beam in the second direction and is substantially larger than the extent of the beam in the third direction. In a preferred embodiment, the cross-section of the beam in a section perpendicular to the direction of its longest extent is generally rectangular or generally quadratic, but could also be generally circular or generally of elliptical shape.

In a preferred embodiment, the cross-sectional shape of the beam in the cross-sections perpendicular to its direction of longest extent stay the same for the majority of the extent of the beam. Most preferably, 60%, most preferably 70%, most preferably 80%, most preferably 90% of the extent of the beam in the direction of its longest extent has the same cross-section. The cross-section might vary towards the respective end of the beam to facilitate the connection of the respective beam to a neighbouring beam. In an especially preferred embodiment, the beam has the same cross-sectional shape along its full extent in its direction of longest extent. This might, for example, be the case, if the beam is an extruded beam.

In a preferred embodiment, where the (first or second) vehicle mounting plate or frame has several beams that are connected to each other, for example screwed together at flanges or welded together or glued together, the individual beams at least for the majority of their extent into their respective direction of longest extent have the same cross-sectional shape.

In a preferred embodiment, where the (first or second) vehicle mounting plate or frame is made up of several beams, the majority of the beams, more preferably all beams have the same cross-sectional design or for those embodiments, where the individual beams only have a constant cross-sectional design for a certain percentage of their individual longitudinal extend, that shape of the cross section, that for a certain percentage of the individual longitudinal extend of the individual beam is constant, is the same shape for the majority of beams, preferably all beams that only have a constant cross-sectional design for a certain percentage of their individual longitudinal extend.

In a preferred embodiment, the beam is a profiled beam. In a preferred embodiment, the profiled beam has a section that in cross-section is c- or u-shaped, whereby the opening of the groove opens towards the interior of the section that in cross-section is c- or u-shaped. In a preferred embodiment, the base plate closes a part of the opening that remains due to the c- or u-shape of that section of the beam. Hence, in the area, where a connector with a base plate is arranged, the base plate can be used to close the c- or u-shaped section of the beam in that area.

In a preferred embodiment of the embodiment, where the (first or second) vehicle mounting plate or frame is made up of several beams, the majority of beams, more preferably all beams are cut off sections from a profiled beam that was cut into sections to provide the majority, preferably all individual beams that make up the (first or second) vehicle mounting plate or frame.

In contrast to a frame, a hoop is understood to be a lightweight piece that gives the gangway, especially the bellows of the gangway, especially the convolutes of the bellows of the gangway some structure. A hoop can, e.g., be an elongated crimping piece that crimps together two ends of neighboring convolutes of a bellows.

The inventors have realized, that the advantages of the invention can already be realized, if the gangway has a first element and a second element of a group of elements that is made up of

- a first vehicle mounting plate at a first end for mounting the gangway to the first car,
- a second vehicle mounting plate at a second end for mounting the gangway to the second car or a frame arranged at the second end for mounting the gangway to a second gangway,
- a frame arranged between the first vehicle mounting plate and the second vehicle mounting plate or arranged between the first vehicle mounting plate and a frame arranged at the second end for mounting the gangway to a second gangway,
- a hoop arranged between the first vehicle mounting plate and the second vehicle mounting plate or arranged between the first vehicle mounting plate and a frame arranged at the second end for mounting the gangway to a second gangway, It is anticipated that in most applications for use of the gangway according to the invention, the gangway will not only have a first element and a second element of this group, but will have further elements of this group. The applicability of the invention is, however, not dependent on the gangway according to the invention to have further elements of the group. As stated above, it is believed that the advantages of the invention can already be obtained to a certain extent, if the gangway only has a first element and a second element of the above-identified group.

However it is anticipated that the advantages obtained with the invention can be especially achieved, if several elements of the above identified group are present. It is preferred, if the number of frames is taken from the range of 1 to 10, preferably from 1 to 7, preferably from 1 to 5, preferably from 1 to 3. It is preferred, if the number of hoops is taken from the range of 1 to 20, preferably from 1 to 15, preferably from 1 to 10, preferably from 1 to 7.

The gangway according to the invention has a normal position in which normal position the first element has a predefined position relative to the second element. Gangways are typically designed with a normal position in mind. In the majority of the cases, the normal position will be that position that the elements of the gangway take up, if the first car of the multi-car vehicle and the second car of the multi-car vehicle are arranged in a straight line and on a level plane. Preferably, the normal position is that position where at some, preferably at least the majority, preferably all elements of the above defined group of elements are arranged in parallel to each other.

According to the invention, a spring element is connected with a first end to a first connection point on the first element and is connected with a second end to a second connection point on the second element, whereby in the normal position of the gangway, the first connection point is at a different height compared to the second connection point and/or the first connection point is arranged further outward than the second connection point and/or the first connection point is arranged further inward than the second connection point.

The invention makes use of the idea to have a spring element arranged between the first element and the second element, whereby the spring element does not run parallel to what would normally be assumed the longitudinal axis of the gangway, when the gangway is in its normal position. The inventors have realized that an angular arrangement of the spring relative to what is typically assumed as the longitudinal axis of the gangway in the normal position is a good means for introducing restoring forces into the gangway, which restoring forces can be used to bring the gangway into a preferred shape in the normal position.

According to the invention, this angular arrangement of the spring element can be provided in several directions.

In a first alternative, a spring element is connected with a first end to a first connection point on the first element and is connected with a second end to a second connection point on the second element, whereby in the normal position of the gangway the first connection point is at a different height compared to second connection point. In the normal position, the spring would hence slant downwards from the first connection point on the first element to the second connection point on the second element, if the first connection point is arranged higher than the second connection point in the normal position.

Alternatively or in combination to this arrangement, the first connection point can be arranged further outward than the second connection point in the normal position. Further outward is to be understood to be further away from the middle of the gangway, If in the normal position the spring element would be arranged such that the first connection point is arranged further outward than the second connection point, but the first connection point and the second connection point are arranged at the same height, the first connection point would be further away from the middle of the gangway than the second connection point which would be arranged closer to the middle of the gangway. The spring element would then be arranged such that in the normal position it would slant inwards from the first connection point to the second connection point. If in the normal position in an embodiment the first connection point would be arranged higher than the second connection point in the normal position of the gangway and the first connection point would be arranged further outward than the second connection point in the normal position of the gangway, the spring element would slant inwards and downwards from the first connection point to the second connection point. If in the normal position the first connection point would be arranged at a lower height compared to the second connection point in the normal position of the gangway and the first connection point would be arranged further outward than the second connection point, the spring element would slant upward and inward from the first connection point to the second connection point in the normal position of the gangway.

Alternatively or in combination to the first alternative arrangement, the first connection point can be arranged further inward than the second connection point in the normal position. Further inward is to be understood to be closer to the middle of the gangway, If in the normal position the spring element would be arranged such that the first connection point is arranged further inward than the second connection point, but the first connection point and the second connection point are arranged at the same height, the first connection point would be closer to the middle of the gangway than the second connection point which would be arranged further away from the middle of the gangway. The spring element would then be arranged such that in the normal position it would slant outwards from the first connection point to the second connection point. If in the normal position in an embodiment the first connection point would be arranged higher than the second connection point in the normal position of the gangway and the first connection point would be arranged further inward than the second connection point in the normal position of the gangway, the spring element would slant outwards and downwards from the first connection point to the second connection point. If in the normal position the first connection point would be arranged at a lower height compared to the second connection point in the normal position of the gangway and the first connection point would be arranged further inward than the second connection point, the spring element would slant upward and outward from the first connection point to the second connection point in the normal position of the gangway.

Alternatively or in combination to the first alternative arrangement, and/or the first connection point is arranged on the other side of a center line of the gangway than the second connection point.

In a preferred embodiment, the gangway according to the invention has
- a first vehicle mounting plate at a first end for mounting the gangway to the first car,
- a second vehicle mounting plate at a second end for mounting the gangway to the second car or a frame arranged at the second end for mounting the gangway to a second gangway,
- a frame arranged between the first vehicle mounting plate and the second vehicle mounting plate or arranged between the first vehicle mounting plate and a frame arranged at the second end for mounting the gangway to a second gangway and/or a hoop arranged between the first vehicle mounting plate and the second vehicle mounting plate or arranged between the first vehicle mounting plate and a frame arranged at the second end for mounting the gangway to a second gangway,
- a bellows made up of one or more convolutes
- whereby the gangway has a normal position, in which normal position
- the first vehicle mounting plate has a predefined position relative to the second vehicle mounting plate,
- the frame, if present, has a predefined position relative to the first vehicle mounting plate,
- the hoop, if present, has a predefined position relative to the first vehicle mounting plate,
- the bellows takes up a predefined shape,
- whereby
  - a spring element is connected with a first end to a first connection point on the first vehicle mounting plate and is connected with a second end to a second connection point on a hoop, whereby in the normal position of the gangway the first connection point is at a different height compared to second connection point and/or the first connection point is arranged further outward than the second connection point and/or the first connection point is arranged further inward than the second connection point and/or
  - a spring element is connected with a first end to a first connection point on the first vehicle mounting plate and is connected with a second end to a second connection point on a frame, whereby in the normal position of the gangway the first connection point is at a different height compared to second connection point and/or the first connection point is arranged further outward than the second connection point and/or the first connection point is arranged further inward than the second connection point and/or
  - a spring element is connected with a first end to a first connection point on the centre frame and is connected with a second end to a second connection point on a hoop, whereby in the normal position of the gangway the first connection point is at a different height compared to second connection point and/or the first connection point is arranged further outward than the second connection point and/or the first connection point is arranged further inward than the second connection point and/or
  - a spring element is connected with a first end to a first connection point on the a first hoop and is connected with a second end to a second connection point on a second hoop, whereby in the normal position of the gangway the first connection point is at a different height compared to second connection point and/or the first connection point is arranged further outward than the second connection point and/or the first connection point is arranged further inward than the second connection point.

Especially the following design alternatives are feasible, each alternative having a bellows made up of one or more convolutes

| Alternative | a first vehicle mounting plate at a first end for mounting the gangway to the first car, | a second vehicle mounting plate at a second end for mounting the gangway to the second car, | a frame at a second end for mounting the gangway to a second gangway, | number of a frames arranged between the first vehicle mounting plate and the second vehicle mounting plate | number of a frames arranged between the first vehicle mounting plate and a frame arranged at the second end | number of a hoops arranged between the first vehicle mounting plate and the second vehicle mounting plate | number of a hoops arranged between the first vehicle mounting plate and a frame arranged at the second end | spring element between first vehicle mounting plate and hoop | spring element between first vehicle mounting plate and frame | at least one spring element between a frame and a hoop | at least one spring element between a hoop and a different hoop |
|---|---|---|---|---|---|---|---|---|---|---|---|
| 1 | yes | yes | no | at least one | none | none | none | none | yes | none | none |
| 2 | yes | yes | no | at least one | none | at least one | none | yes | no | no | no |
| 3 | yes | yes | no | at least one | none | at least one | none | yes | no | yes | no |
| 4 | yes | yes | no | at least one | none | at least two | none | yes | no | no | yes |
| 5 | yes | yes | no | at least one | none | at least two | none | yes | no | yes | yes |
| 6 | yes | no | yes | none | at least one | none | none | none | yes | none | none |
| 7 | yes | no | yes | none | at least one | none | at least one | yes | no | no | no |
| 8 | yes | no | yes | none | at least one | none | at least one | yes | no | yes | no |
| 9 | yes | no | yes | none | at least one | none | at least two | yes | no | no | yes |
| 10 | yes | no | yes | none | at least one | none | at least two | yes | no | yes | yes |

In a preferred embodiment, the gangway has a frame that is designed as a centre frame and which centre frame is arranged between the first vehicle mounting plate and the second vehicle mounting plate, preferably in the middle between the first vehicle mounting plate and the second vehicle mounting plate, whereby in this embodiment of the invention, the gangway preferably has at least one hoop that is arranged between the first vehicle mounting plate and the centre frame. In a preferred embodiment, more than one hoop is arranged between the first vehicle mounting plate and the centre frame. In an even more preferred embodiment, at least one hoop is also arranged between the second vehicle mounting plate and the centre frame. In an even more preferred embodiment, several hoops are arranged between the centre frame and the second vehicle mounting plate. In a preferred embodiment the number of hoops arranged between first vehicle mounting plate and the centre frame or the number of hoops arranged between the centre frame and the second vehicle mounting plate is taken from the range of 1 to 10, preferably 1 to 7, preferably 1 to 5, preferably 1 to 3.

In a preferred embodiment, the gangway has a frame that is arranged at the second end of the gangway, whereby the gangway has a further frame, which further frame is arranged between the first vehicle mounting plate and the frame at the second end of the gangway, preferably in the middle between the first vehicle mounting plate and the frame at the second end of the gangway, whereby in this embodiment of the invention, the gangway preferably has at least one hoop that is arranged between the first vehicle mounting plate and the further frame. In a preferred embodiment, more than one hoop is arranged between the first vehicle mounting plate and the further frame. In an even more preferred embodiment, at least one hoop is also arranged between the frame arranged at the second end of the gangway and the frame. In an even more preferred embodiment, several hoops are arranged between the frame arranged at the second end of the gangway and the frame. The frame at the second end of the gangway could be attached to a frame arranged at an end of a second gangway.

In a preferred embodiment, a series of elements is arranged between the first vehicle mounting plate and the second vehicle mounting plate, whereby each element of the series is either a frame or a hoop. In a preferred embodiment, a series of elements is arranged between the first vehicle mounting plate and the frame arranged at the second end of the gangway, whereby each element of the series is either a frame or a hoop. In a preferred embodiment the number of hoops arranged between frames is taken from the range of 1 to 10, preferably 1 to 7, preferably 1 to 5, preferably 1 to 3.

In a preferred embodiment, the majority of the elements, preferably each element of the series is connected to its neighboring element of the series by a spring element and/or whereby the first element of the series is connected by a spring element to the first vehicle mounting plate and/or the last element of the series is connected by a spring to the second vehicle mounting plate or the frame arranged at the second end of the gangway respectively.

In a preferred embodiment, a group of spring elements, whereby each spring element of the group connects two neighboring elements of the series, is provided, whereby at least some of the spring elements of the group, preferably all are arranged in a zig-zag line if viewed from above and/or if viewed from the side.

In a preferred embodiment, the gangway has a first group of spring elements, whereby each spring element of the first group connects two neighboring elements of the series, whereby at least some of the spring elements of the first group, preferably all are arranged in a zig-zag line if viewed from above and/or if viewed from the side and the gangway has a second group of spring elements, whereby each spring element of the second group connects two neighboring elements of the series, whereby at least some, preferably all of the spring elements of the second group are arranged in a zig-zag line if viewed from above and/or if viewed from the side. In a preferred embodiment the spring elements of the first group connect different neighboring elements of the series than the spring elements of the second group. Such an embodiment allows for the zig-zag arrangement to re-start and to have two different zig-zap patterns in the gangway.

In a preferred embodiment, a group of spring elements, whereby each spring element of the group connects two neighboring elements of the series is provided, whereby at least some of the spring elements of the group are arranged in a saw-toothed manner, if viewed from above and/or if viewed from the side.

In a preferred embodiment, the gangway has a first group of spring elements, whereby each spring element of the first group connects two neighboring elements of the series, whereby at least some of the spring elements of the first group, preferably all are arranged in a saw-toothed manner if viewed from above and/or if viewed from the side and the gangway has a second group of spring elements, whereby each spring element of the second group connects two neighboring elements of the series, whereby at least some, preferably all of the spring elements of the second are arranged in a saw-toothed manner if viewed from above and/or if viewed from the side. In a preferred embodiment the spring elements of the first group connect different neighboring elements of the series than the spring elements of the second group. Such an embodiment allows for the saw-toothed arrangement to re-start and to have two different saw-toothed patterns in the gangway.

In a preferred embodiment, at least one element of the series has a first connection point for a first spring and a second connection point for a second spring, whereby in the normal position of the gangway the first connection point and the second connection point are at the same height and/or are arranged equally far outward. In a preferred embodiment, where the series has a frame and one or several hoops, only the frame has a first connection point for a first spring and a second connection point for a second spring, whereby in the normal position of the gangway the first connection point and the second connection point are at the same height and/or are arranged equally far outward. In a preferred embodiments, one or more of the hoops may have a first connection point for a first spring and a second connection point for a second spring, whereby in the normal position of the gangway the first connection point and the second connection point are at different height and/or are arranged differently far outward.

In a preferred embodiment the spring element is a coil spring or a gas strut.

In a preferred embodiment, the majority of spring elements, preferably all spring elements of a group of spring elements is to the same type, for example each spring element of a group of spring elements is a coil spring. Designs are feasible, where within a group of spring elements, coil springs and gas struts are present. But it is preferred that in a group of spring elements, all spring elements are off the same type.

In a preferred embodiment, the majority of spring elements, preferably all spring elements of a group of spring elements is to the same type and same design, for example each spring element of a group of spring elements is a coil spring with the same spring constant and same length.

In a preferred embodiment the spring element in the normal position of the gangway is pretensioned. In a preferred embodiment, where a group of spring elements is provided, preferably the majority of spring elements of the group, preferably all spring elements of the group are pretensioned in the normal position. "Pretensioned" is to be understood as compressed or expanded in comparison to the form that the spring element would have, if nothing was attached to it.

In a preferred embodiment the connection of the respective end of the spring element with the respective connection point is a detachable connection. The connection point can, for example, be a hook, onto which a ring or a hook provided at the end of the spring element can be placed. The connection point can, for example, be a ring, into which a hook provided at the end of the spring element can be placed. Other designs are feasible, where at least one element of a spring element, preferably both spring elements are permanently attached to the respective element. The connection point could hence be a welding.

In a preferred embodiment, the gangway has a passenger space provided for the passengers to pass through the gangway. In a preferred embodiment, a spring or a spring element is provided below the passenger space. As an alternative or in addition, a spring or a spring element is provided above the passenger space. As an alternative or in addition, a spring or a spring element is provided on one side of the passenger space and even more preferably on both sides of the passenger space.

In a preferred embodiment, a floor plate is provided, which in an embodiment where a first vehicle mounting plate is provided is connected to the first vehicle mounting plate. In a preferred embodiment, a floor plate is provided, which in an embodiment where a frame is provided is connected to frame. In a preferred embodiment a spring element or a group of spring elements is arranged below the floor plate.

In a preferred embodiment, a support structure is provided, whereby the support structure is connected to the first vehicle mounting plate and/or the support structure is connected to the second vehicle mounting plate and/or the support structure is connected to the frame and/or the frame rests on the support structure.

In a preferred embodiment, the gangway has at least one bellows. The gangway might have an outwardly facing bellows. An outwardly facing bellows is understood to be a bellows, whereby the individual convolutes of the bellows open towards the inside of the gangway while the rounded or v-shaped bottoms of the individual convolutes are arranged further outward. The gangway might have an inwardly facing bellows. An inwardly facing bellows is understood to be a bellows, whereby the individual convolutes of the bellows open towards the outside of the gangway while the rounded or v-shaped bottoms of the individual convolutes are arranged further inward. The gangway might even have outwardly facing bellows and inwardly facing bellows. The inwardly facing bellows might be arranged to the inside of the outwardly facing bellows such that the bottoms of the individual convolutes of the inwardly facing bellows form the elements that delimit the passage space, while the bottoms of the individual convolutes of the outwardly facing bellows form part of the outside perimeter of the gangway. The inwardly facing bellows might also be arranged to the outside of the outwardly facing bellows such that the bottoms of the individual convolutes of the outwardly facing bellows and the bottoms of the individual convolutes of the inwardly facing bellows face each other in a middle section of the gangway, while the individual convolutes of the inwardly facing bellows open towards the outside of the gangway and the individual convolutes of the inwardly facing bellows open towards the inside of the gangway. The gangway might also have two inwardly facing bellows, the one being arranged inside the other. The gangway might have two outwardly facing bellows, the one being arranged inside the other. The gangway might have no bellows or might have in addition to bellows sliding walls that slide relative to each other in a telescopic manner. One end of the bellows might be attached to the first vehicle mounting plate. The attachment of the end of the bellows to the first vehicle mounting plate can be made by bolts, stitching, clamping or possibly even a Velcro arrangement or even gluing or welding.

The multi-car vehicle according to the invention has a first car and a second car and has a gangway according to the invention, whereby the first vehicle mounting plate is connected to the first car and the second vehicle mounting plate is connected to the second car.

In an alternative, the multi-car vehicle according to the invention has a first car and a second car and has a first gangway according to the invention, with a first vehicle mounting plate that is connected to the first car and has a second gangway according to the invention, with a second vehicle mounting plate that is connected to the second car, whereby the first gangway has a frame at the second end of the first gangway that is attached to a frame that is provided a the other end of the second gangway (that end of the second gangway that is opposite to the end on which the second vehicle mounting plate is arranged).

BRIEF DESCRIPTION OF DRAWINGS

The invention will be described by way of figures that only show possible embodiments of the invention.

DETAILED DESCRIPTION

Figure 1:
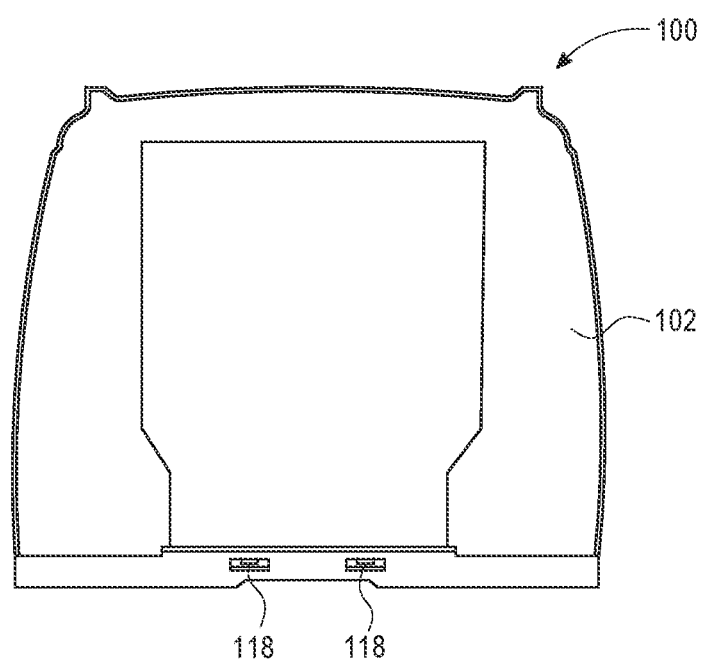
FIG. 1 a sectional view from inside a car of a multi-car vehicle onto the end of the car and a gangway that is arranged between the car and a second car of the multi-car vehicle.
Figure 5:
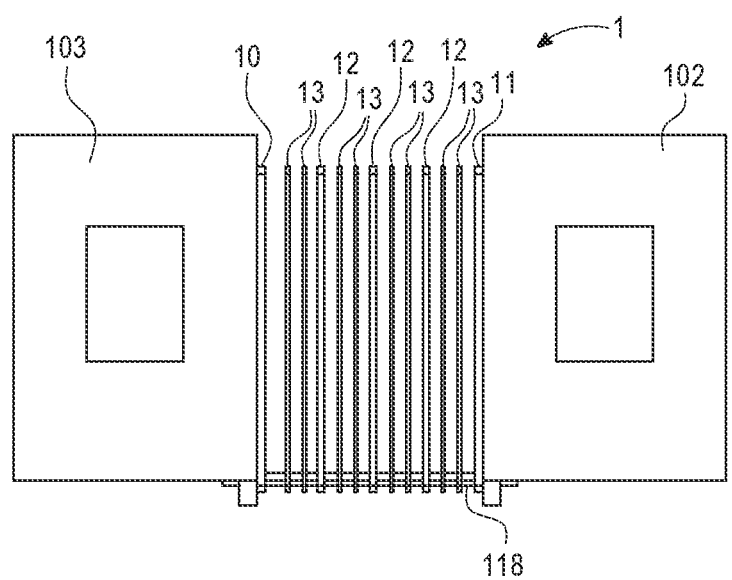
FIG. 5 shows a schematic sectional view from the side onto the two cars of the multi-car vehicle that are connected by the gangway
Figure 6:
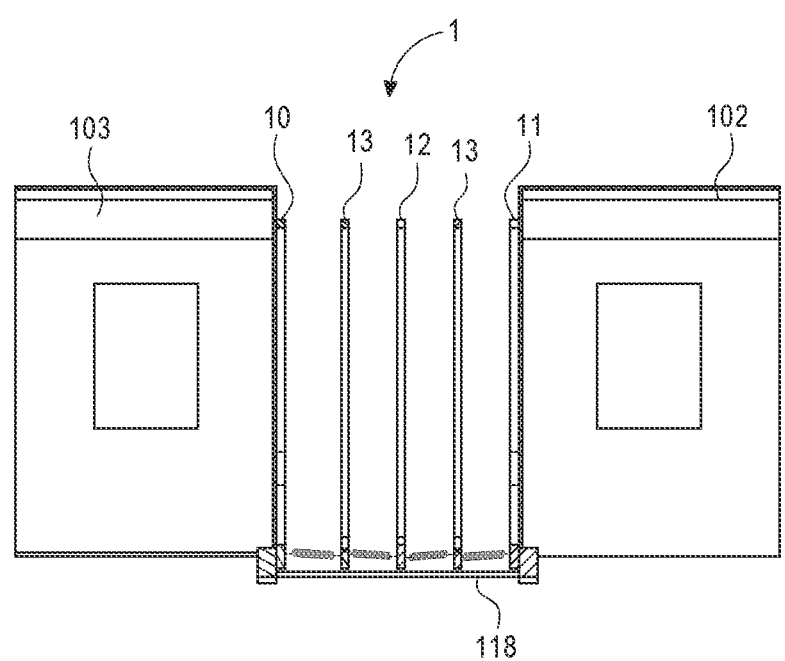
FIG. 6 shows a schematic sectional view from the side onto the two cars of the multi-car vehicle that are connected by the gangway in a different embodiment.

FIGS. 1, 5 and 6 show a part of a multi-car vehicle 100 with a first car 102 and a second car 103. A gangway 1 that connects the first car 102 with the second car 103 is arranged between the first car 102 and the second car 103.

Figure 2:
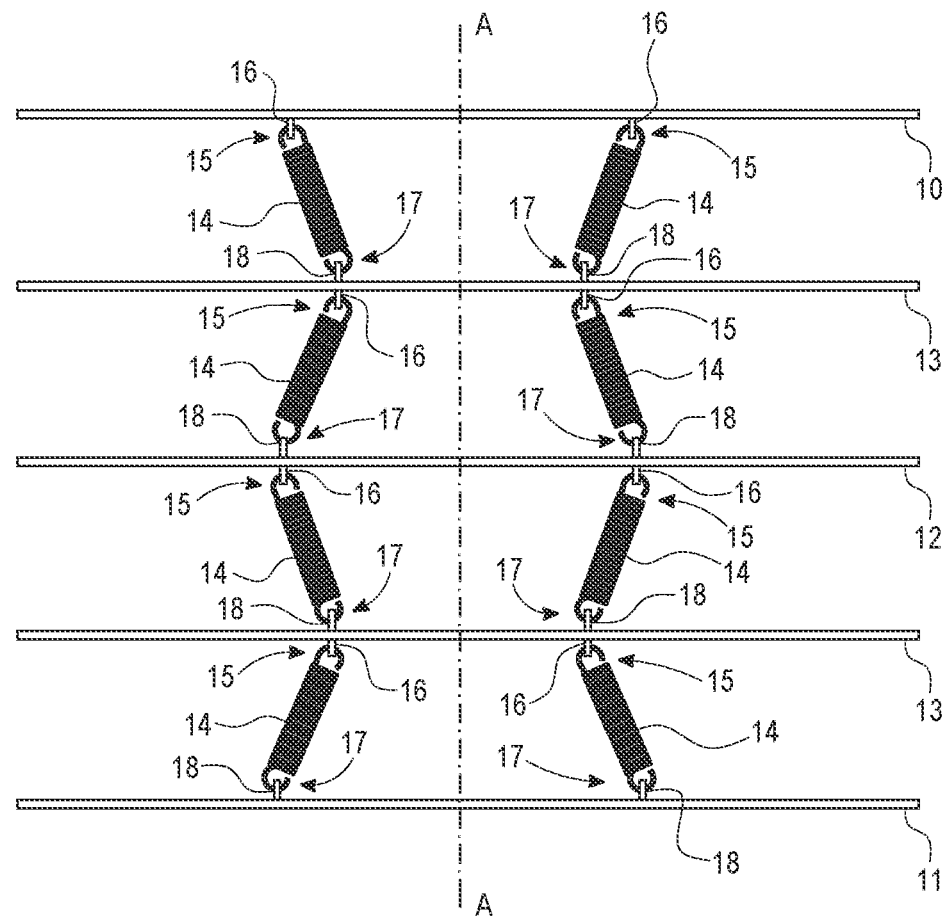
FIG. 2 A schematic top view onto the bottom beam of a first vehicle mounting, the bottom beam of a second vehicle mounting, the bottom beam of a frame, the bottom beam of a first hoop and the bottom beam of a second hoop of a gangway according to the invention.

FIG. 2 shows a schematic top view onto a first vehicle mounting plate 10 at a first end of a gangway 1 and a second vehicle mounting plate 11 at the second end of the gangway 1. A frame 12 in the form of a centre frame is arranged between the first vehicle mounting plate 10 and the second vehicle mounting plate 11. Two hoops 13 are arranged between the first vehicle mounting plate 10 and the second vehicle mounting plate 11. A first hoop 13 is arranged between the first vehicle mounting plate 10 and the frame 12. A second hoop is arranged between the second vehicle mounting plate 11 and the frame 12. This embodiment is also shown in FIG. 6.

The embodiment of the gangway 1 shown in FIG. 5 has a first vehicle mounting plate 10 at a first end of a gangway 1 and a second vehicle mounting plate 11 at the second end of the gangway 1. A frame 12 in the form of a centre frame is arranged between the first vehicle mounting plate 10 and the second vehicle mounting plate 11. A further frames 12 is arranged between the centre frame and the first vehicle mounting plate 10. A further frame 12 is arranged between the centre frame and the second vehicle mounting plate 11. Hoops 13 are arranged between the first vehicle mounting plate 10 and the second vehicle mounting plate 11 and the frames 12.

The gangway 1 is supported by two support beams 118. The first vehicle mounting plate 10, the second vehicle mounting plate 11 and the frames 12 each are supported by the support beams 118. The hoops 13 are arranged distanced from the support beams 118 and are not supported by the support beams 118. This is done by having the hoops 13 have large gaps in their bottom region that allow the beams 118 to pass freely through these gaps without making contact with the hoops 13.

The gangway 1 in FIG. 2 is shown without the bellows and especially without the convolutes of the bellows being attached to the first vehicle mounting plate 10, the second vehicle mounting plate 11, the frame 12 and the two hoops 13. This is made in order to facilitate the view of FIG. 2.

Figure 4:
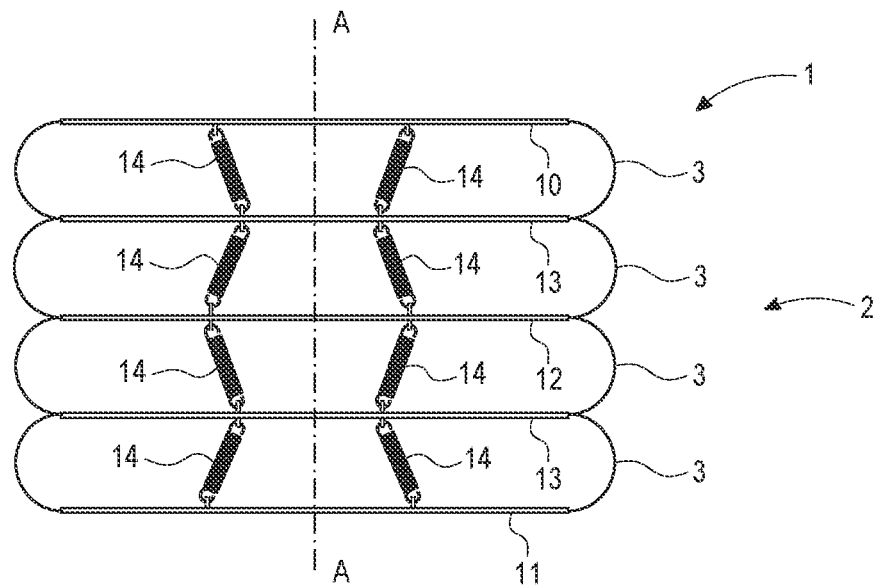
FIG. 4 A schematic top view onto the bottom beam of a first vehicle mounting, the bottom beam of a second vehicle mounting, the bottom beam of a frame, the bottom beam of a first hoop and the bottom beam of a second hoop of a gangway according to the invention with a sectional view onto the convolutes of the bellows of the gangway

FIG. 4 shows the gangway 1 with bellows and especially with the convolutes of the bellows attached to the first vehicle mounting plate 10, the second vehicle mounting plate 11, the frame 12 and the two hoops 13.

The gangway 1 in FIG. 2 is shown in its normal position. In this normal position, the first vehicle mounting plate 10, the second vehicle mounting plate 11, the frame 12 and the two hoops 13 have a predefined position relative to one another. In the design of the gangway shown in FIG. 2, the normal position is the position where each of the group of elements made up of the first vehicle mounting plate 10, the second vehicle mounting plate 11, the frame 12 and the two hoops 13 are in parallel to each other and on the same height (see FIG. 3).

In the design shown in FIG. 2, the middle of the gangway 1 is symbolized by the centre line A-A.

In the embodiment shown in FIG. 2, a series of elements is arranged between the first vehicle mounting plate 10 and the second vehicle mounting plate 11. This series of elements contains three elements, namely the one frame 12 and two hoops 13. Hence, each element of the series is either a frame 12 or a hoop 13.

In the embodiment shown in FIG. 2, each element of the series is connected to its neighboring element of the series by a spring element 14. The first element of the series (in this case the hoop 13 that is arranged between the first vehicle mounting plate 10 and the frame 12) is connected by a spring element 14 to the first vehicle mounting plate 10. The last element of the series, which in this case is the hoop 14 that is arranged between the frame 12 and the second vehicle mounting plate 11 is connected by a spring element 14 to the second vehicle mounting plate 11.

In the design shown in FIG. 2, each element of the series is also connected to its neighboring element of the series by a second spring 14. Each element of the series is connected to its neighboring element of the series by a spring element 14 arranged on one side of the centre line A-A and by a spring element arranged on the opposite side of the centreline A-A.

As can be seen from FIG. 2, each spring element 14 is connected with a first end 15 to a first connection point 16 on a first element (e.g. the first vehicle mounting plate 10 or the hoop 13 or the frame 12 or the second vehicle mounting plate 11) and is connected with a second end 17 to a second connection point 18 on the second element (e.g. the hoop 13, the frame 12 or the second vehicle mounting plate 11), whereby in the normal position of the gangway as shown in FIG. 2, the first connection point 16 is either arranged further outward than the second connection point 18 or the first connection point 16 is arranged further inward than the second connection point 18.

Figure 3:
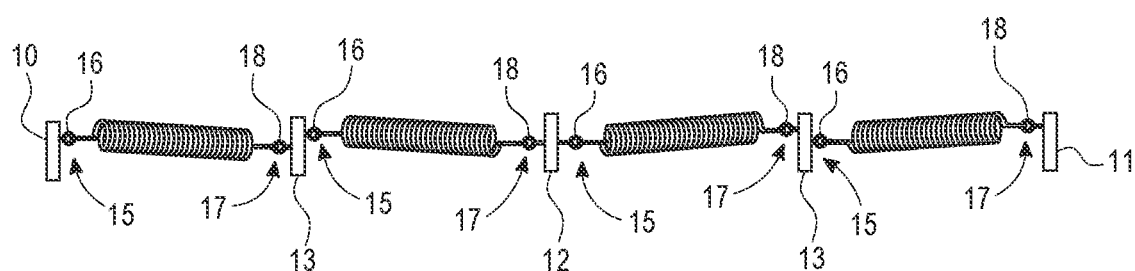
FIG. 3 a side view onto the bottom beam of the first vehicle mounting, the bottom beam of the second vehicle mounting, the bottom beam of the frame, the bottom beam of the first hoop and the bottom beam of the second hoop of a gangway according to the invention as shown in FIG. 2.

As can be seen from FIG. 3, each spring element 14 is connected with a first end 15 to a first connection point 16 on a first element (e.g. the first vehicle mounting plate 10 or the hoop 13 or the frame 12 or the second vehicle mounting plate 11) and is connected with a second end 17 to a second connection point 18 on the second element (e.g. the hoop 13, the frame 12 or the second vehicle mounting plate 11), whereby in the normal position of the gangway as shown in FIG. 2, the first connection point 16 is at a different height compared to the second connection point 18.

FIG. 4 shows the gangway 1 with the first vehicle mounting plate 10, the second vehicle mounting plate 11, the frame 12 that is designed as a centre frame and two hoops 13 as well as the spring elements 14 arranged in between each element of the group. At the same time, FIG. 4 shows the bellows 2 of the gangway 1. The bellows 2 in the embodiment shown in FIG. 4 is made up of four convolutes 3. One convolute 3 is attached with one end to the first vehicle mounting plate 10 and with the opposite end to the hoop 13. One convolute 3 is attached with one end to the hoop 13 and with the opposite end to the frame 12. A further convolute 3 is attached to the frame 12 with one end and attached to the hoop 13 with the opposite end. A further convolute 3 is attached to the hoop 13 with one end and to the second vehicle mounting plate 11 with the opposite end.

The invention claimed is:

1. A gangway for connecting a first car of a multi-car vehicle to a second car, the gangway comprising:
a first end and a second end;
a first vehicle mounting plate for mounting the first end of the gangway to the first car;
at least one of a second vehicle mounting plate for mounting the second end of the gangway to the second car and a face plate for mounting the second end of the gangway to a second gangway;
a series of elements arranged between the first vehicle mounting plate and the at least one of the second vehicle mounting plate and the faceplate, wherein each element of the series is one of a frame and a hoop;
wherein the gangway has defined therein a normal position, in which normal position at least one of the first vehicle mounting plate, the second vehicle mounting plate, the face plate, and an element of the series, is a first item having a predefined position relative to a second item, which second item is another one of the first vehicle mounting plate, the second vehicle mounting plate, the face plate, and an element of the series;
wherein a plurality of spring elements is provided, and wherein for a majority of the elements of the series, an element of the series is connected to a neighbouring element of the series by at least one of the plurality of spring elements; and
wherein at least one spring element of the plurality of spring elements is connected to a first connection point on the first item, and to a second connection point on the second item, and wherein, in the normal position of the gangway, the first connection point is located in at least one of the following positions: at a different height relative to the second connection point, further outward than the second connection point, further inward than the second connection point, and opposite to the second connection point with respect to a center line of the gangway.

2. The gangway according to claim 1, wherein the gangway further comprises:
a bellows made up of one or more convolutes;
and wherein, in said normal position,
the first vehicle mounting plate has a predefined position relative to the second vehicle mounting plate,
at least one of the elements of the series has a predefined position relative to the first vehicle mounting plate,
the bellows is of a predefined shape,
and wherein
the at least one spring element includes a first end and a second end, wherein the first end of the at least one spring element is connected to the first connection point on the first item and the second end of the at least one spring element is connected to the second connection point on the second item.

3. The gangway according to claim 1, wherein at least one of the elements of the series is a frame arranged between the first vehicle mounting plate and the second vehicle mounting plate, and at least another one of the elements of the series is a hoop arranged between the first vehicle mounting plate and the frame.

4. The gangway according to claim 1, wherein at least one of the elements of the series is a center frame.

5. The gangway according to claim 1, wherein each element of the series is connected to a neighbouring element of the series by at least one of the plurality of spring elements, and wherein the first element of the series is connected by at least one of the plurality of spring elements to the first vehicle mounting plate, and a last element of the series is connected by at least one of the plurality of spring elements to the second vehicle mounting plate.

6. The gangway according to claim 5, further comprising a group of spring elements among the plurality of spring elements, each spring element of the group connecting two neighbouring elements of the series, wherein at least some of the spring elements of the group are arranged in a zig-zag line relative to a top view or side view.

7. The gangway according to claim 5, further comprising a group of spring elements among the plurality of spring elements, each spring element of the group connecting two neighbouring elements of the series, wherein at least some of the spring elements of the group are arranged in a saw-toothed configuration relative to a top view or side view.

8. The gangway according to claim 4, wherein at least one element of the series has a first connection point for a first spring element of the plurality of spring elements, and a second connection point for a second spring element of the plurality of spring elements, and wherein in the normal position of the gangway the first connection point and the second connection point are at a same height and/or are arranged equally far outward.

9. The gangway according to claim 1, wherein the at least one spring element is a coil spring or a gas strut.

10. The gangway according to claim 1, wherein the at least one spring element in the normal position of the gangway is pretensioned.

11. The gangway according to claim 1, further comprising a floor plate connected to the first vehicle mounting plate or the frame.

12. The gangway according to claim 1, further comprising a support structure, wherein the support structure supports and is connected to at least one of the first vehicle mounting plate and the second vehicle mounting plate.

13. The gangway according to claim 12, wherein the support structure supports and is connected to the first vehicle mounting plate, the second vehicle mounting plate, and the frame.

14. The gangway according to claim 13, wherein the support structure comprises two support beams, and wherein the one or more hoops are arranged at a distance from the support beams and are unsupported by the support beams.

15. A multi-car vehicle with a first car and a second car, and a gangway, wherein the gangway comprises:
a first end and a second end;
a first vehicle mounting plate for mounting the first end of the gangway to the first car;
at least one of a second vehicle mounting plate for mounting the second end of the gangway to the second car, and a face plate for mounting the second end of the gangway to a second gangway; and
a series of elements arranged between the first vehicle mounting plate and the at least one of the second vehicle mounting plate and the faceplate,
wherein each element of the series is one of a frame and a hoop;
wherein the gangway has defined therein a normal position, in which normal position at least one of the first vehicle mounting plate, the second vehicle mounting plate, the face plate, and an element of the series is a first item that has a predefined position relative to a second item, which is another one of the first vehicle mounting plate, the second vehicle mounting plate, the face plate, and an element of the series;
wherein a plurality of spring elements is provided, and wherein for a majority of the elements of the series, an element of the series is connected to a neighbouring element of the series by at least one of the plurality of spring elements, and wherein at least one spring element of the plurality of spring elements is connected to a first connection point on the first item, and to a second connection point on the second item, and wherein, in the normal position of the gangway, the first connection point is located in at least one of the following positions: at a different height relative to the second connection point, further outward than the second connection point, further inward than the second connection point, and opposite to the second connection point with respect to a center line of the gangway; and wherein the first vehicle mounting plate is connected to the first car and the second vehicle mounting plate is connected to the second car.

16. The gangway according to claim 2, wherein the first end of the at least one spring element is connected to the first vehicle mounting plate, and the second end of the at least one spring element is connected to a hoop, wherein in the normal position of the gangway, the first connection point is at a different height compared to the second connection point.

17. The gangway according to claim 2, wherein the first end of the at least one spring element is connected to the first vehicle mounting plate, and the second end of the at least one spring element is connected to a frame.

18. The gangway according to claim 2, wherein the first end of the at least one spring element is connected to a center frame, and the second end of the at least one spring element is connected to a hoop.

19. The gangway according to claim 2, wherein the first end of the at least one spring element is connected to a first hoop, and the second end of the at least one spring element is connected to a second hoop.

20. The gangway according to claim 2, wherein, in the normal position of the gangway, the first connection point is at a different height relative to the second connection point, and the first connection point is arranged one of: further outward than the second connection point and further inward than the second connection point.

21. A gangway for connecting a first car of a multi-car vehicle to a second car, the gangway comprising:
a first end and a second end;
a bellows made up of one or more convolutes;
a first vehicle mounting plate for mounting the first end of the gangway to the first car;
at least one of a second vehicle mounting plate for mounting the second end of the gangway to the second car and a face plate for mounting the second end of the gangway to a second gangway; and
a center frame and a hoop each being arranged between the first vehicle mounting plate and the at least one of the second vehicle mounting plate and the face plate, and
at least one spring element having a first end and a second end,
wherein the gangway has defined therein a normal position, in which normal position the first vehicle mounting plate has a predefined position relative to the second vehicle mounting plate, the center frame has a predefined position relative to the first vehicle mounting plate, the hoop has a predefined position relative to the first vehicle mounting plate, and the bellows is of predefined shape,
wherein the first end of the at least one spring element is connected to a first connection point on the center frame and the second end of the at least one spring element is connected to a second connection point on the hoop, and
wherein, in the normal position of the gangway, the first connection point is located in at least one of the following positions: at a different height relative to the second connection point, further outward than the second connection point, further inward than the second connection point, and opposite to the second connection point with respect to a center line of the gangway.

* * * * *